(12) United States Patent
Huff

(10) Patent No.: US 8,007,695 B2
(45) Date of Patent: Aug. 30, 2011

(54) METHOD OF FABRICATING SMALL DIMENSIONED LENS ELEMENTS AND LENS ARRAYS USING SURFACE TENSION EFFECTS

(75) Inventor: Michael A. Huff, Oakton, VA (US)

(73) Assignee: Corporation for National Research Initiatives, Reston, VA (US)

( * ) Notice: Subject to any disclaimer, the term of this patent is extended or adjusted under 35 U.S.C. 154(b) by 37 days.

(21) Appl. No.: 12/382,255

(22) Filed: Mar. 12, 2009

(65) Prior Publication Data

US 2009/0283927 A1    Nov. 19, 2009

Related U.S. Application Data

(60) Provisional application No. 61/071,777, filed on May 16, 2008.

(51) Int. Cl.
*B29D 11/00* (2006.01)
(52) U.S. Cl. .......................... 264/1.32; 216/26
(58) Field of Classification Search ........... 264/1.32; 216/26
See application file for complete search history.

(56) References Cited

U.S. PATENT DOCUMENTS

| 5,435,887 | A | * | 7/1995 | Rothschild et al. | 216/26 |
| 6,814,901 | B2 | * | 11/2004 | Itoh | 264/1.38 |
| 2005/0103745 | A1 | * | 5/2005 | Li | 216/26 |

OTHER PUBLICATIONS

StateMaster Encyclopedia, "Corrective Lens", copyright 2005, accessed Sep. 9, 2010 at http://www.statemaster.com/encyclopedia/Corrective-lens, p. 5.*

* cited by examiner

*Primary Examiner* — Yogendra Gupta
*Assistant Examiner* — Alison Hindenlang
(74) *Attorney, Agent, or Firm* — Nixon & Vanderhye, PC

(57) ABSTRACT

A method is disclosed of implementing lens elements or lens arrays having dimensions ranging from a few centimeters down to the micro-scale or nano-scale using the surface tension of the lens material in a molten state to allow the curved shape of the lens to be precisely defined. The method has useful application in the fabrication of lens elements and lens arrays out of a large variety of material types, including elemental materials, as well as compound materials and alloys. The method also allows the implementation of lenses having far superior surface smoothness compared to other approaches, as well as very accurate lens shapes. The method allows the making of high quality lenses and lens arrays, wherein the diameter of the lenses are on the order of a few microns or less. Convex, concave, plano-convex, plano-concave, compound lenses, and many other types of lens shapes can be implemented using the method of the present invention.

47 Claims, 10 Drawing Sheets

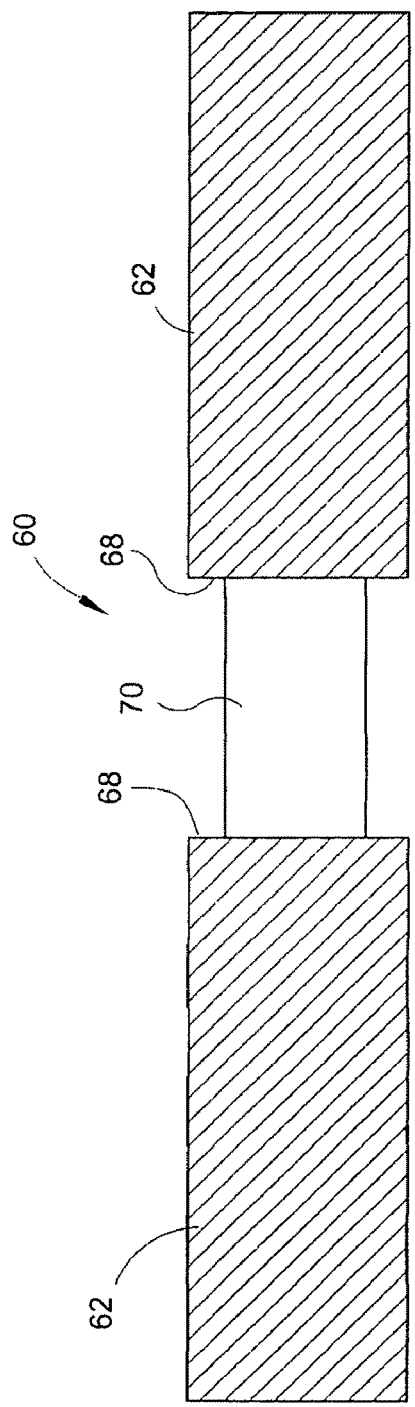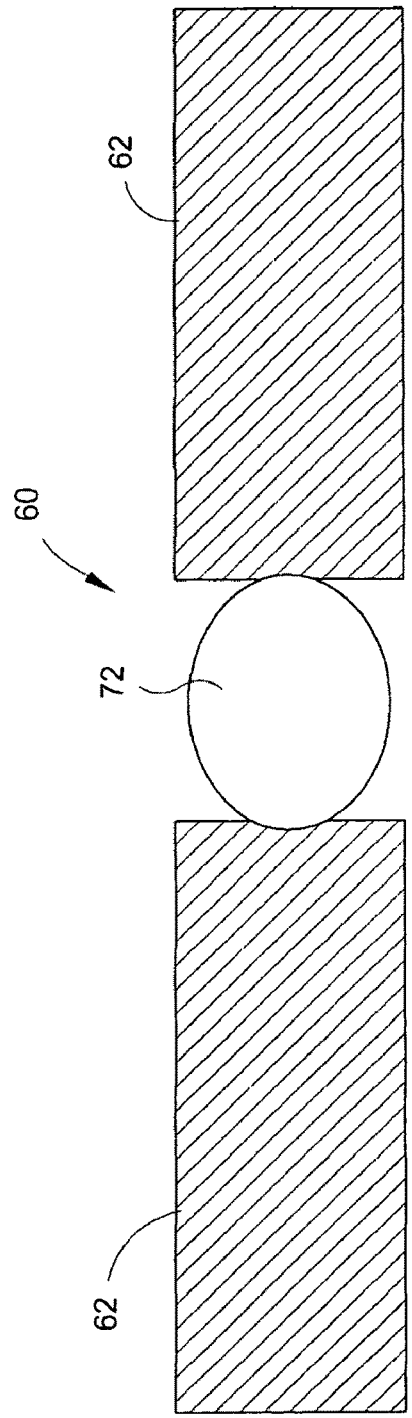

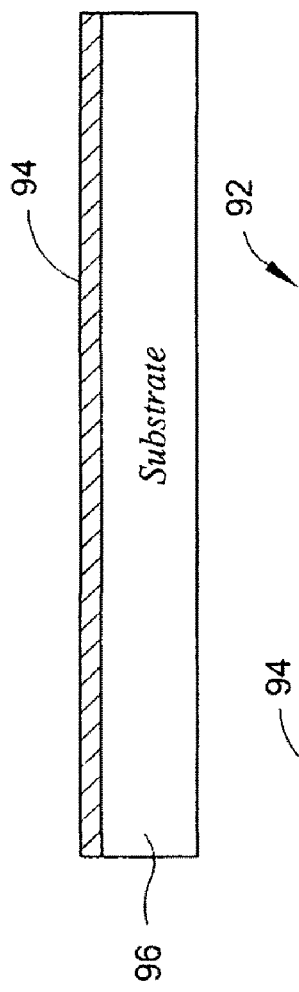
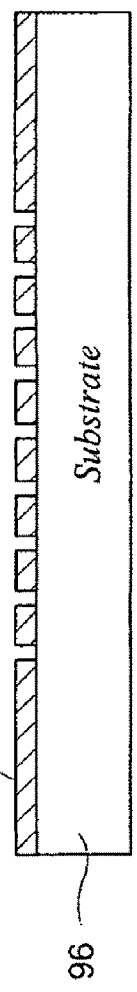
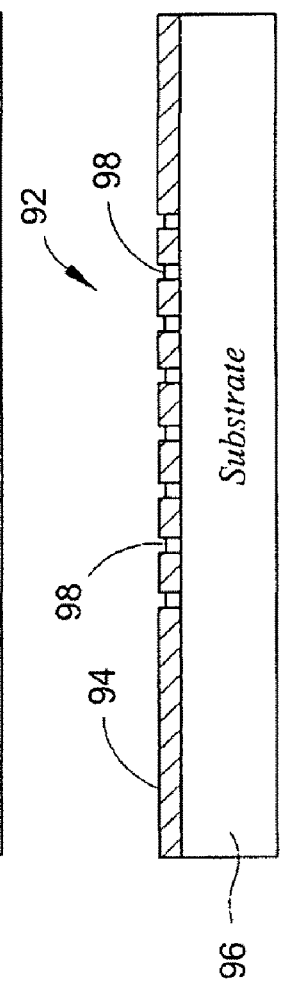
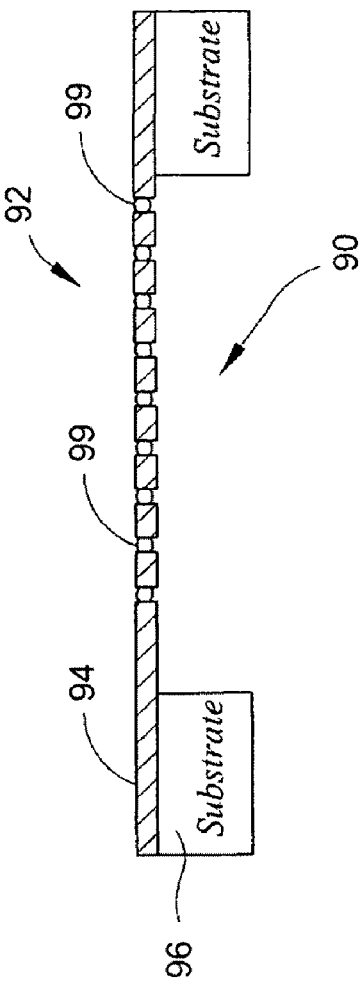
Fig. 8a
Fig. 8b
Fig. 8c
Fig. 8d

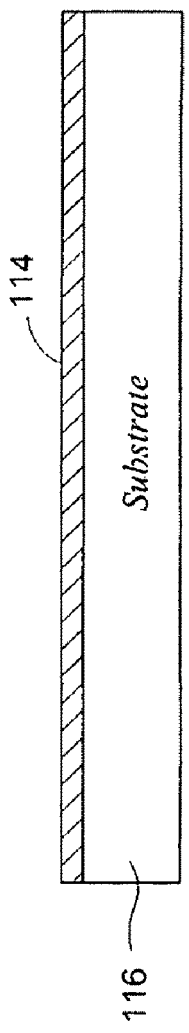
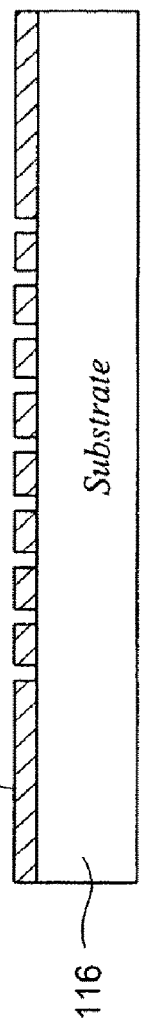
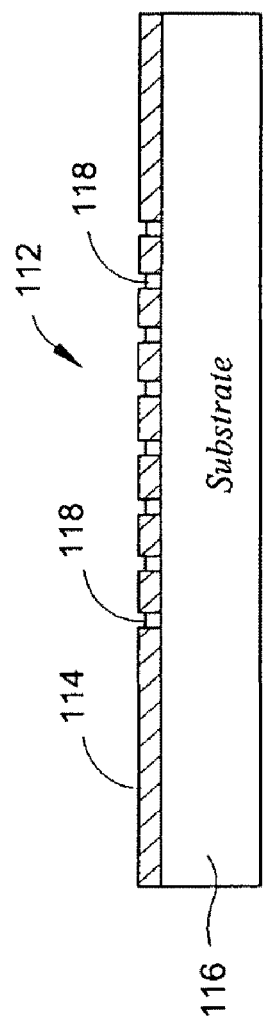
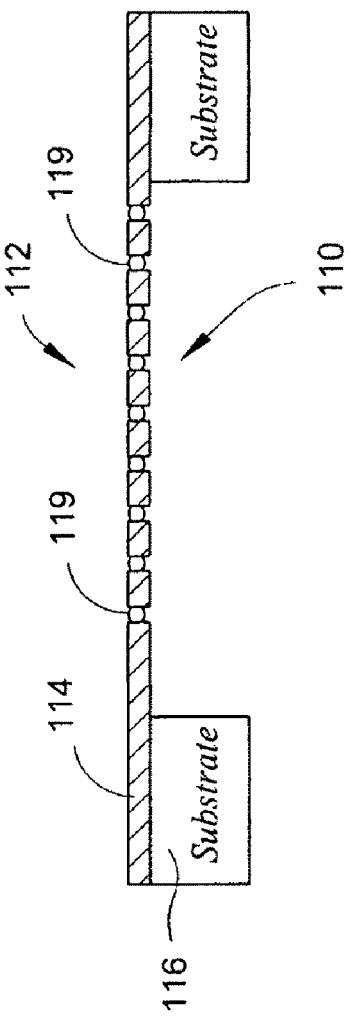

METHOD OF FABRICATING SMALL DIMENSIONED LENS ELEMENTS AND LENS ARRAYS USING SURFACE TENSION EFFECTS

CROSS-REFERENCE TO RELATED APPLICATION

This application claims the benefit of Provisional Application No. 61/071,777, filed May 16, 2008, the entire contents of which are hereby incorporated by reference in this application.

FIELD OF INVENTION

The present invention relates to lenses, and, more particularly, to a method of implementing lens elements or lens arrays having dimensions ranging from a few centimeters down to the micro- or nano-scale using the surface tension of the lens material in a molten state to allow the curved shape of the lens to be precisely defined.

BACKGROUND OF THE INVENTION

The making of lenses and lens arrays is an extremely important part of modern technology, particularly in optics and photonics. Lenses at the macro-scale (i.e., a few centimeters in diameter or larger) can be made using a variety of methods, including various machining methods (e.g., diamond turning, etc.), molding, embossing, etc., to obtain adequately high levels of precision for most applications. The fabrication of lenses and lens arrays at the micro-scale is a more recent development and has become a very important part of modern semiconductor manufacturing. These micro-lenses and micro-lens arrays are typically made using specialized semiconductor processes to allow the implementation of lens profiles with performance far inferior to that of similar types of lenses made at the macro-scale. These methods include: photolithography of a resist pattern followed by a re-flow of the resist and a subsequent Reactive Ion Etching (RIE) of the underlying substrate to form a curved and smooth lens shape; gray-scale lithography followed by a RIE; micro-machining fabrication of a tool mold having the lens pattern on it followed by hot embossing or molding of a material into the lens shape; the direct micromachining of a substrate surface using a focused ion beam (FIB); etc.

While these methods have allowed the implementation of lenses and lens arrays at the small dimensional size, including the micro-scale, they have several shortcomings. First, these methods involve fabrication processes that are extremely difficult to control or to obtain reproducible results from batch to batch. As a result, the yield of these methods can be quite low with the resultant consequence of higher cost components. Second, most of these processes result in some significant distortions of the lens shapes with negative consequences for the performance of the lenses or lens arrays. Third, the surface smoothness of RIE etched or FIB machined surfaces are typically very rough (e.g., more than a few nanometers) which degrade the performance of the lens elements due to photon scattering as well as other effects. Fourth, the use of a FIB tool to make lenses is an extremely slow process, is performed on a very expensive tool, and is, therefore, an extremely expensive method to make lenses and lens arrays. Fifth, the use of molding and embossing allows the high cost of the tool mold to be amortized over many parts, so as to obtain a relatively low cost method for making lenses and lens arrays; however, molding and embossing is an elevated temperature process, and the materials used in these processes tend to have large thermal expansion coefficients, thereby resulting in lens shapes that distort as the lens material cools back to room temperature. Sixth, none of the methods discovered to date allow the fabrication of extremely small-dimensioned lenses and lens arrays. The existing methods are limited to lenses having a diameter of at least tens to hundreds of microns, or more. Seventh, as the lower limit of the dimensions that lenses and lens arrays can be fabricated using existing methods are approached, the distortions on the shape of the lenses, surface roughness of the lens, as well as other quality aspects of the lens increasingly and quickly degrade. Consequently, there is an enormous opportunity for a new technique, whereby lenses and lens arrays can be fabricated that have excellent optical properties.

SUMMARY OF THE INVENTION

It is, therefore, an object of the present invention to provide a method for the fabrication of singular lens elements or lens arrays.

It is another object of the present invention to provide a method for the fabrication of singular lens elements or lens arrays having small dimensions, specifically from a few millimeters in diameter down to a few tens of nanometers in diameter.

It is another object of the present invention to provide a method for the fabrication of singular lens elements or lens arrays using the surface tension of the lens material to form the correct lens shape.

It is another object of the present invention to provide a method for the fabrication of singular lens elements or lens arrays out of a large variety of different elemental or compound materials.

It is another object of the present invention to provide a method for the fabrication of singular lens elements or lens arrays that are either of the concave or convex lens type.

It is another object of the present invention to provide a method for the fabrication of singular lens elements or lens arrays that are either of the plano-concave or plano-convex lens type.

It is another object of the present invention to provide a method for the fabrication of singular lens elements or lens arrays that are of the compound lens type.

It is another object of the present invention to provide a method for the fabrication of singular lens elements or lens arrays that are of the positive meniscus or negative meniscus lens type.

It is another object of the present invention to provide a method for the fabrication of singular lens elements or lens arrays that allows extremely smooth surface finishes.

It is another object of the present invention to provide a method for the fabrication of singular lens elements or lens arrays having excellent optical properties and also low manufacturing costs.

It is another object of the present invention to provide a method for the design and fabrication of singular lens elements or lens arrays with predictable, but arbitrary shaped curved surfaces.

It is another object of the present invention to provide a method for the fabrication of singular lens elements or lens arrays for applications at the extreme short wavelengths, such as the near ultra-violet, extreme ultra-violet, or x-ray wavelengths.

These and other objectives are realized in the present invention by using a novel and very flexible fabrication methodology combined with innovative design improvements.

The present invention results from surface tension effects that are common when two different materials come into contact and one of the materials is heated to above its melting point.

The present invention relates to lenses, and, more particularly, to a method of making lens elements or lens arrays having dimensions ranging from a few centimeters down to the micro-scale or nano-scale using the surface tension of the lens material in a molten state to allow the curved shape of the lens to be precisely defined. The method of the present invention has useful application in the fabrication of lens elements and lens arrays out of a large variety of material types, including elemental materials, as well as compound materials and alloys. Furthermore, the method of the present invention allows the implementation of lenses having far superior surface smoothness compared to other approaches, as well as very accurate lens shapes. There are many benefits provided by the method of the present invention, including low cost, high level of accuracy and surface smoothness, etc. But importantly, the method of the present invention is the only method available for making high quality lenses and lens arrays in which the diameters of the lenses are on the order of a few microns or less. Convex, concave, plano-convex, plano-concave, compound lenses, and many other types of lens shapes can be made using the method of the present invention

BRIEF DESCRIPTION OF THE DRAWINGS

FIG. 6a and 6b are an illustration of a fabrication process according to the present invention for making a convex lens.

FIGS. 8a-8d are an illustration of a fabrication process according to the present invention for making a convex lens array.

FIGS. 10a-10d are an illustration of a fabrication process for making a refractive lens from ruthenium for an Extreme Ultraviolet system.

DETAILED DESCRIPTION OF THE INVENTION

The present invention is directed to a method of fabricating lens elements and lens arrays using the surface tension of the lens material(s) to develop a desired lens surface contour or shape and thereby make a high performance refractive lens. A variety of different types of lenses can be fabricated using the method of the present invention, including concave or convex lenses, as well as many others types of lenses. Additionally, lens arrays composed of a multiplicity of lens elements can also be made using the method of the present invention. Furthermore, the method of the present invention allows the fabrication of lens elements and lens arrays having an unprecedented small lateral lens diameter, as well as extremely smooth surface finishes, which is not possible with existing methods of lens and lens array fabrication. The present invention also provides an extremely low cost and relatively simple production method for lens elements and lens arrays, as compared to existing methods.

Figure 1B:
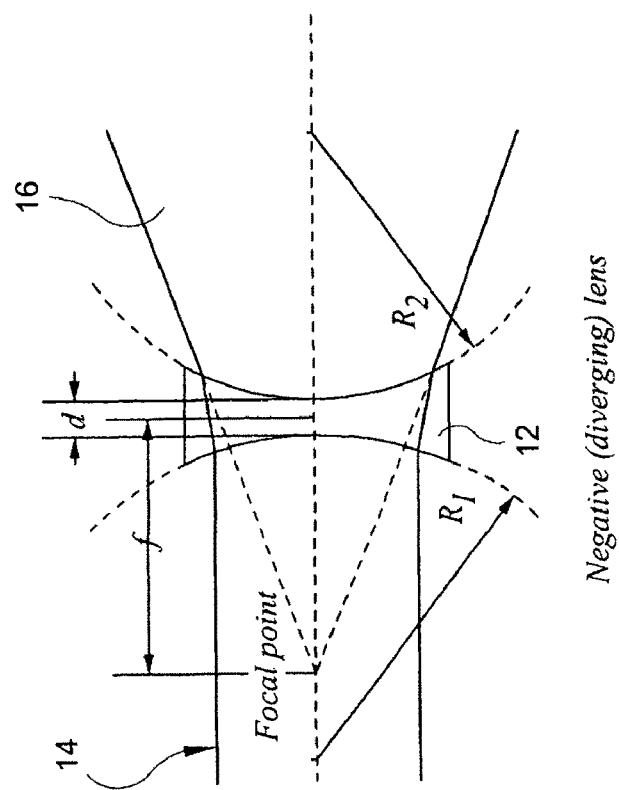
FIGS. 1a and 1b are cross sectional illustrations of a convex (converging) lens element and a concave (diverging) lens element, respectively.
Figure 1A:
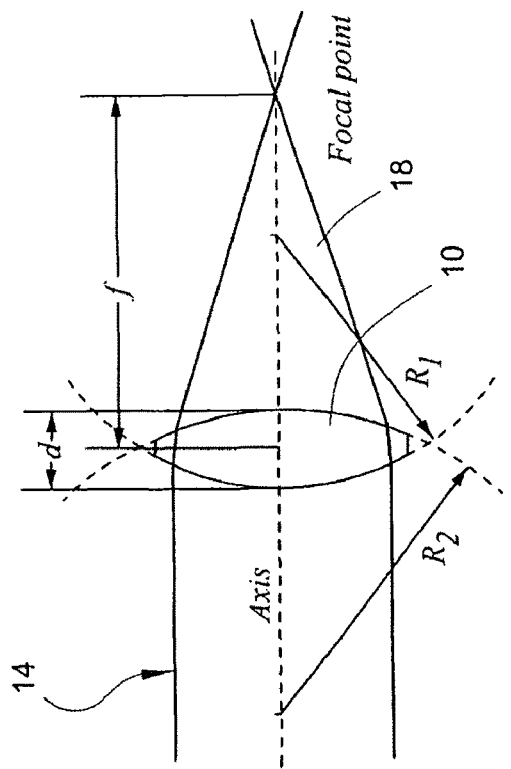

FIGS. 1a and 1b illustrate two common types of lens elements that are used to transmit and refract radiation so as to concentrate or diverge an electromagnetic radiation beam. Specifically, FIGS. 1a and 1b are cross sectional illustrations of a convex (converging) lens element 10 and a concave (diverging) lens element 12, respectively. These lens elements are composed of materials that have a differing index of refraction, as compared to the surrounding medium (usually air or free space, but possibly a liquid in some special circumstances). Electromagnetic radiation 14 propagates through the surrounding medium and impinges onto either converging lens element 10 or diverging lens element 12, each of which has perfect or approximate axial symmetry and transmits and refracts the radiation 14. The radiation 14 continues through the lens element 10 or 12 and exits the other side. The differing index of refraction between the lens material and the surrounding medium combined with the curvature of the lens results in the bending of the radiation either toward the center axis of converging lens element 10 or away from the center axis of diverging lens element 12. The shapes of lenses shown in FIGS. 1b and 1a are concave and convex, respectively, which results in the radiation passing through the lens to become diverging 16 or converging 18, respectively.

As shown in FIGS. 1a and 1b, the focal length of a lens in free space can be calculated using lens equation 1 below:

$$\frac{1}{f} = (n-1)\left[\frac{1}{R_1} - \frac{1}{R_2} + \frac{(n-1)d}{nR_1R_2}\right], \quad \text{Eq. 1}$$

where: f is the focal length of the lens; n is the index of refraction of the lens material; $R_1$ is the radius of curvature of the lens surface closest to the light source; $R_2$ is the radius of curvature of the lens surface farthest from the light source; and d is the thickness of the lens (the distance along the lens axis between the two surface vertices).

If the lens thickness is small compared to the radii of curvature, $R_1$ and $R_2$, then lens equation 1 can be simplified by the so-called thin lens equation 2, given by:

$$\frac{1}{f} \approx (n-1)\left[\frac{1}{R_1} - \frac{1}{R_2}\right]. \quad \text{Eq. 2}$$

The focal length is positive for converging lenses and negative for diverging lenses and the optical power of a lens is given by 1/f.

Figure 2:
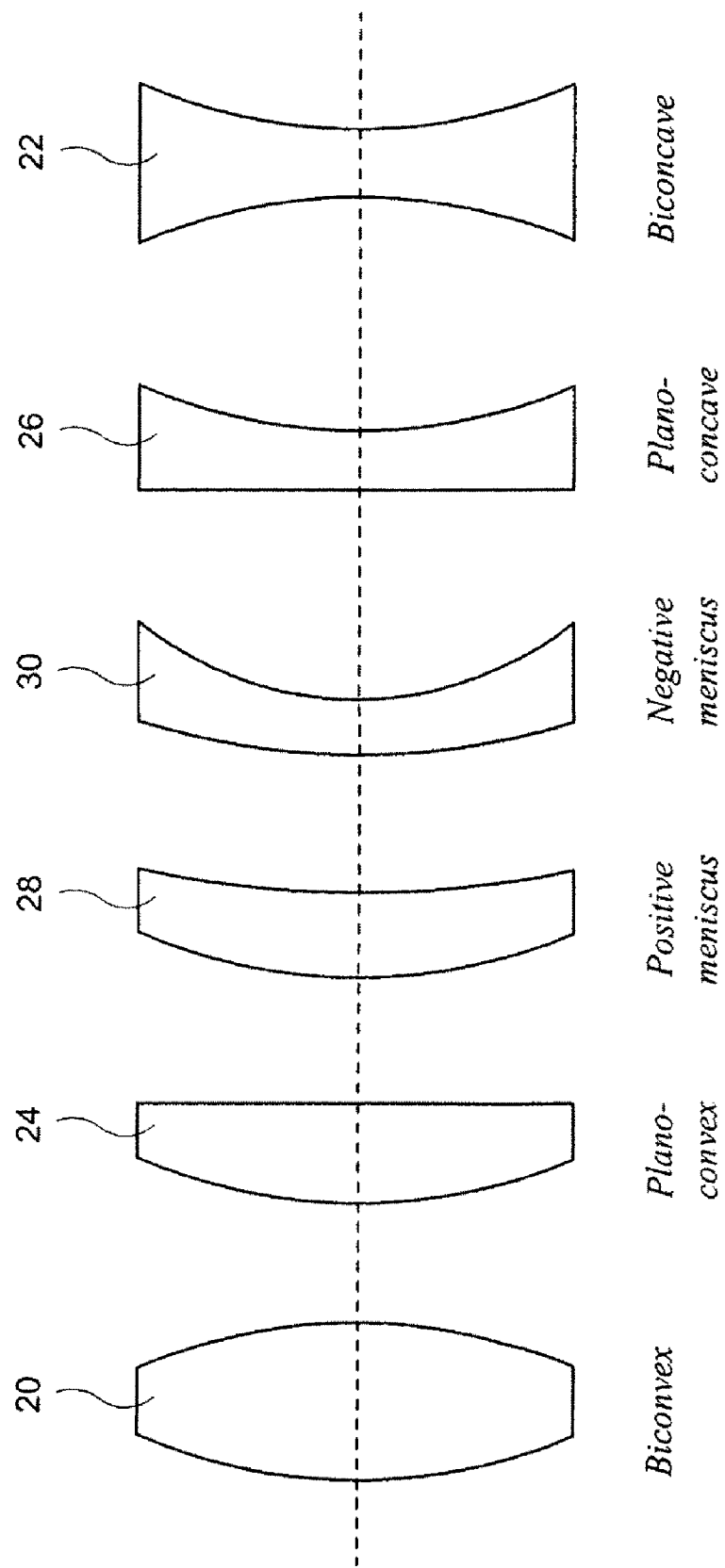
FIG. 2 is a cross sectional illustration of several types of simple lenses.

FIG. 2 illustrates the common types of simple lenses, which are classified according to the curvature of the two optical surfaces. A lens is termed bi-convex if both surfaces are convex, as shown. A lens 22 is termed "bi-concave" if both of its surfaces are concave, as shown. If one of the two surfaces is flat and the other surface is curved, the lens is termed plano-convex (lens 24) or plano-concave (lens 26), depending on the curvature of the non-flat surface. If the two surfaces are curved, with one surface being convex and the other surface being concave, if the concave surface has a greater radius than that of the convex surface, the lens 28 is termed "positive meniscus". Conversely, if the convex surface has a radius greater than that of the concave surface, the lens 30 is termed "negative meniscus".

Figure 3:
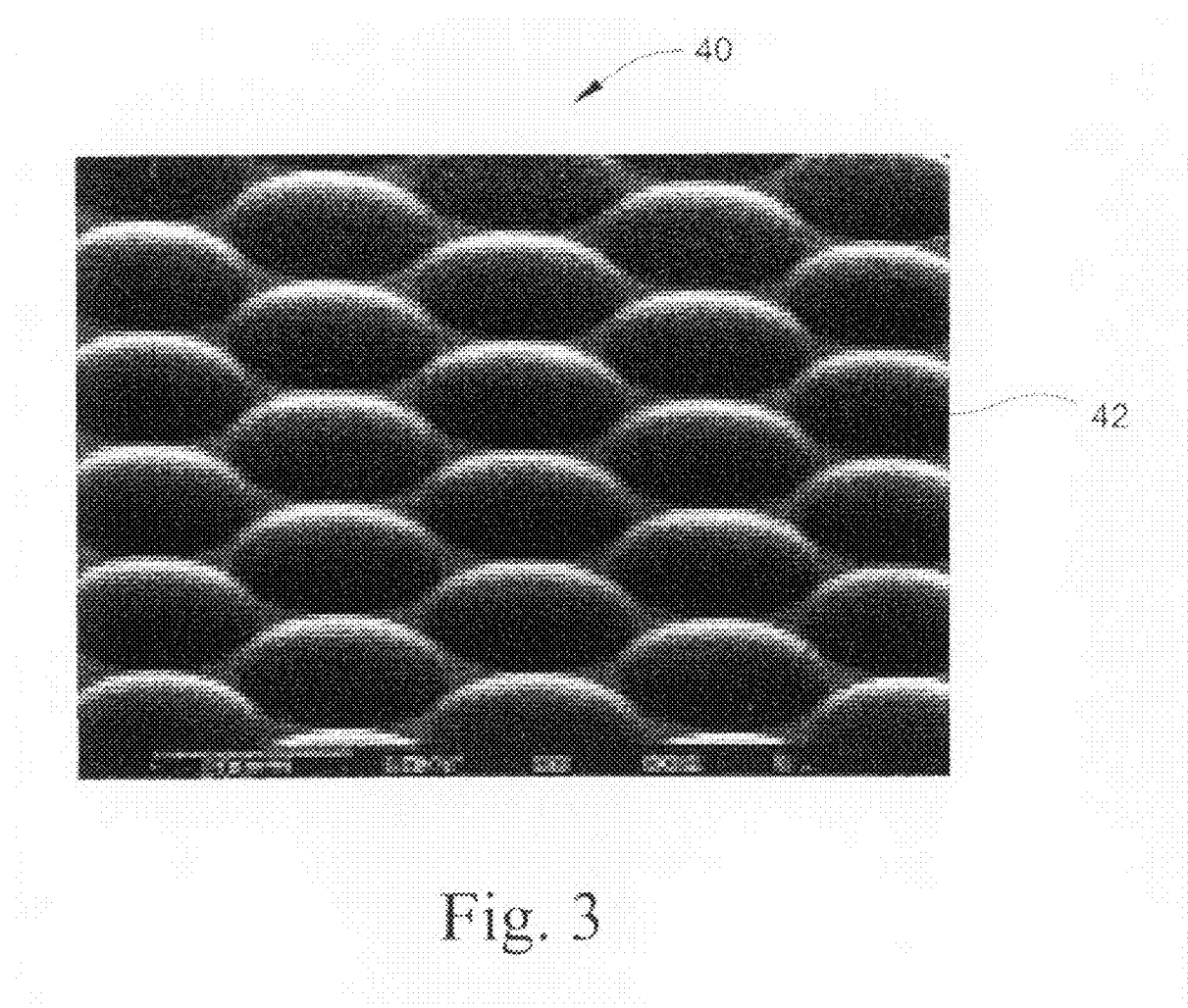
FIG. 3 is a scanning electron micrograph of a microlens array.

FIG. 3 is a Scanning Electron Micrograph (SEM) of an array 40 of microlenses 42 made using standard microfabrication techniques. This lens array 40 was made by photolithography on the surface of a substrate, followed by a plasma reaction ion etching of the surface to form the curved surface of each of the microlenses 42.

Figure 4:
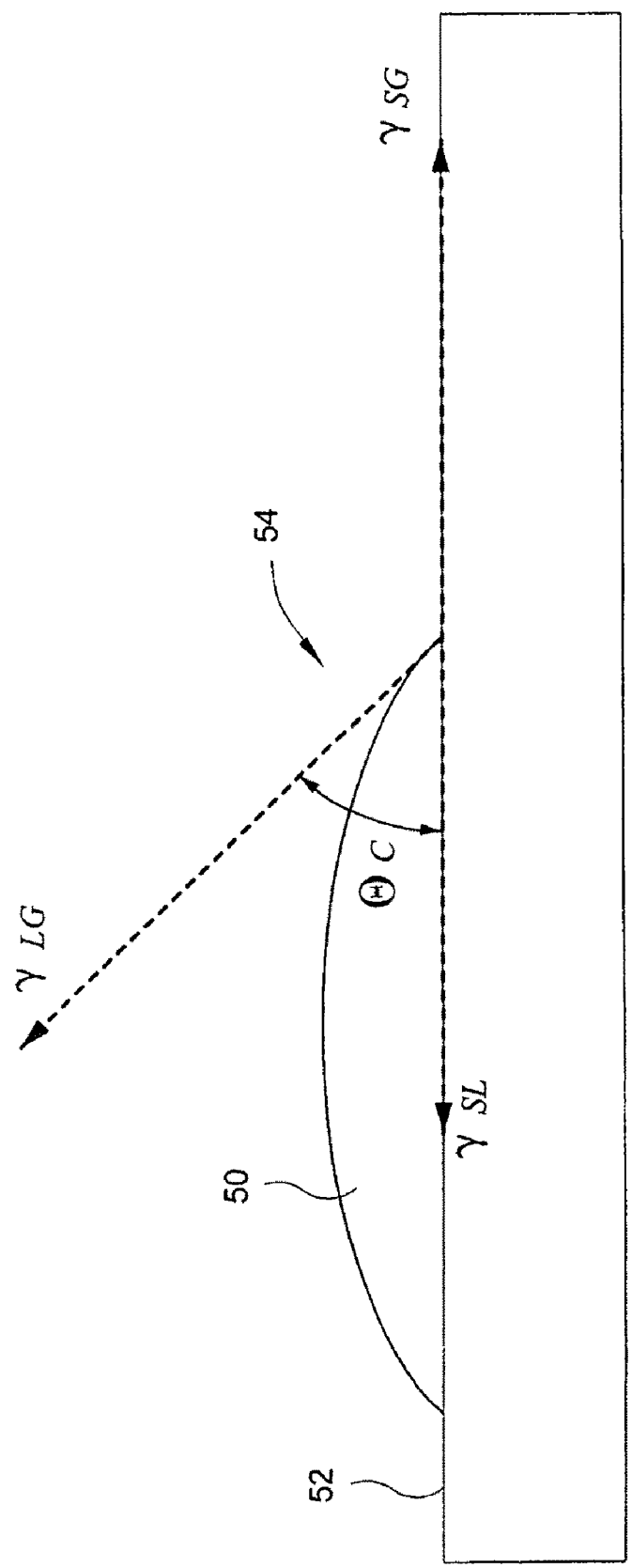
FIG. 4 is an illustration of surface tension effect of a liquid placed onto the surface of another material with the contact angle being shown.

FIG. 4 is an illustration of a liquid droplet on a solid surface 52 displaying the effect of contact angle and wetting. When the liquid droplet 50, solid surface 52 and ambient gas (e.g., air) are brought into contact with one another, intermolecular interactions between and within these materials result. The amount of wetting depends on the energies (or surface tensions) of the interfaces involved, such that the potential energy is minimized. The degree of wetting is described by the contact angle 54, which is the angle at which the liquid-vapor interface meets the solid-liquid interface. If the wetting is very favorable, the contact angle 54 will be low (e.g., approximately 0 degrees), and the fluid will spread to cover a larger area of the surface 52. If the wetting is unfavorable, the contact angle 54 will be large (e.g., approximately 150 to 180 degrees), and the fluid will form a compact droplet 50 on the surface. Regardless of the amount of wetting, the shape of a drop wetted to a rigid surface is approximately a truncated sphere.

A contact angle of 90° or greater generally characterizes a surface as not-wettable, and one less than 90° as wettable. When the liquid is water, a wettable surface is termed hydrophilic and a non-wettable surface as hydrophobic. Superhydrophobic surfaces have contact angles greater than 150°, showing almost no contact between the liquid drop and the surface.

The effects of surface tension, contact angle and wetting are used in the method of the present invention to fabricate lenses and lens arrays, as described below.

In general, the surface tension, contact angle and wetting all depend on the liquids and solids and surrounding medium (usually air), as well as temperature, pressure, and external forces (i.e., gravity, electrical field, etc.). A set of thermodynamic equations can be used to predict the contact angle of the liquid/solid interface.

The shape of the lens can be predicted using these equations of thermodynamics as follows. The Young equation 3 is given by:

$$0 = \gamma_{SV} - \gamma_{SL} - \gamma_{LG} \cos \Theta_c,$$  Eq. 3 where $\gamma_{SV}$ is the solid-vapor interfacial energy, $\gamma_{SL}$ is the solid-liquid interfacial energy, $\gamma_{LG}$ is the liquid-gas interfacial energy, and $\Theta_c$ is the equilibrium contact angle. This equation 3 assumes a perfectly flat surface 52. Knowing the respective interfacial energies allows the contact angle 54 to be calculated, and thereby, the shape and type of the lens to be designed and fabricated, as desired.

Figure 5A:
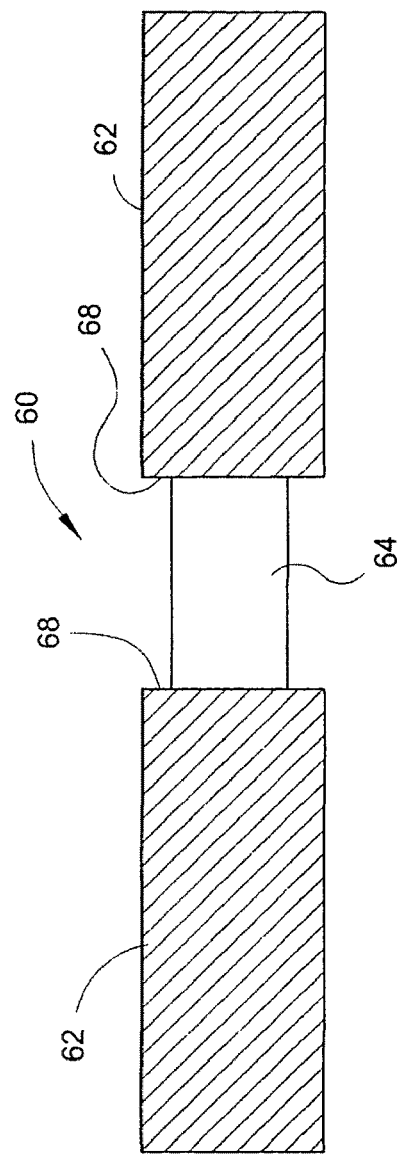
FIGS. 5a and 5b are an illustration of a fabrication process according to the present invention for making a concave lens.
Figure 5B:
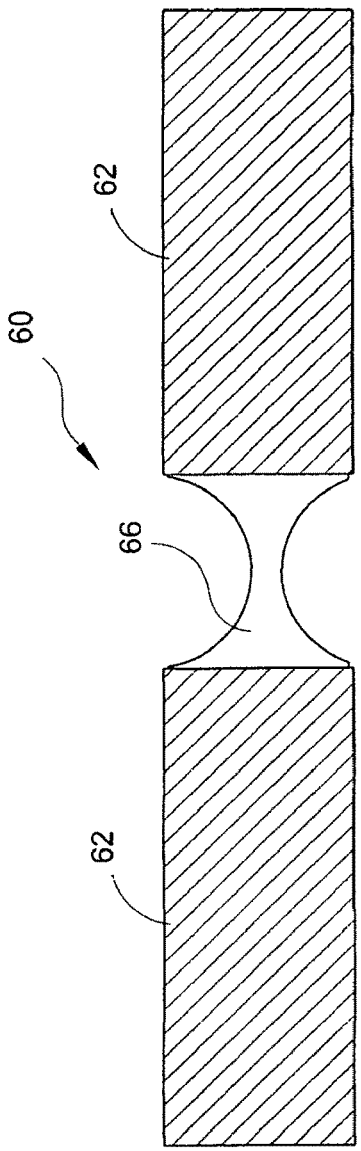

FIGS. 5a and 5b are an illustration of one method or process of the present invention to fabricate a single lens element. The process begins with the making of a hole 60 in a layer of material 62. The method for making the hole 60 varies, depending on the size of the hole, as well as the materials from which the substrate 62 is made. One method is to perform photolithography on a thin device layer, resulting in a pattern transfer from a photo mask to a resist layer mask on the surface of the device layer.

Subsequently, the device layer is etched using Reactive Ion Etching (RIE) or a similar technique that allows the hole 60 to be precisely etched, even if the hole dimensions are relatively small. After the etching is completed, the material 64 from which the lens 66 is to be made is deposited on to the substrate 62 so as to leave the material 64 in the hole 60 as shown in FIG. 5a. For example, this may be accomplished using a lift-off procedure. Subsequently, the substrate 62 is then heated to a temperature at which the lens material 64 becomes molten and changes its shape based on the surface tension and contact angle between it and the substrate material it is in contact with, as shown in FIG. 5b. The substrate 62 is then cooled to room temperature to solidify the lens material 64 and retain the lens shape 66.

The lens 66 made by the fabrication process shown in FIGS. 5a and 5b is a concave lens type, and is a result of the lens material 64 in the molten liquid state wetting the surface 68 of the substrate 62. A convex lens 72 shape can also be fabricated using a similar method by employing a lens material 70 that, in the molten state, has a large contact angle with respect to the substrate material 62, as shown in FIGS. 6a and 6b.

The shape of the lens 66 or 72 is controlled by several parameters, including: the contact angle of the lens material 64 or 70 in the molten state on the substrate material 62; the amount of lens material deposited into the hole 60 prior to the melting process; the diameter of the hole 60 made in the substrate; the temperature of the process; and the pressure of the process. Gravity forces may also be a consideration if the lens is of sufficient size, but for small-dimensioned lenses, gravity will have a negligible effect. Also, external forces, such as an applied electrical field, may be used to control the shape of the lens element made using this technique. The shape of the lens can be designed as desired using the Young equation 3 set forth above.

Importantly, this technique does not require the etching, machining, or other similar types of processes on a lens material to form the lens shape, and therefore, avoids the problems of surface defects and roughness that significantly degrade the quality and performance of lenses made with other methods. Using the method of the present invention allows the lens surface to be exceptionally smooth, and, therefore, to have unprecedented optical performance. This is a result of the surface energy minimization that is inherent in this technique, wherein the surface will assume the smoothest shape possible in order to reduce its potential energy. Any roughness of the surface would necessarily have a higher energy state than a smooth surface.

Figure 7A:
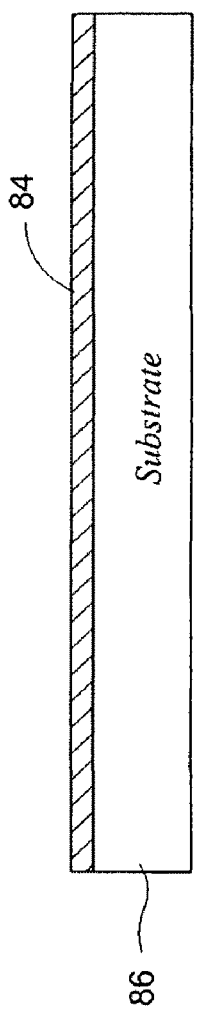
FIGS. 7a-7d are an illustration of a fabrication process according to the present invention for making a concave lens array.
Figure 7B:
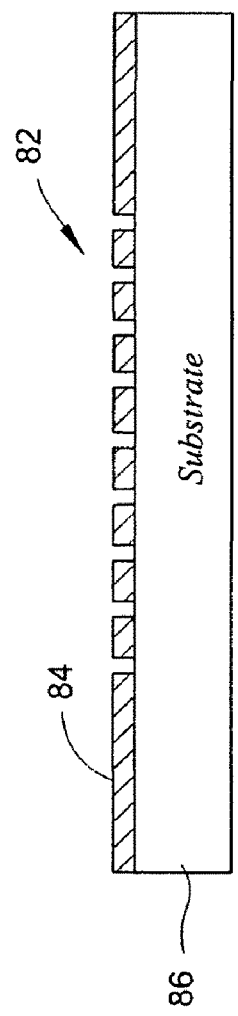
Figure 7C:
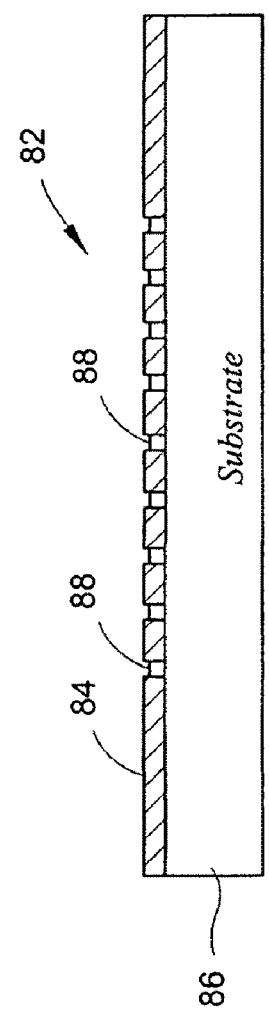
Figure 7D:
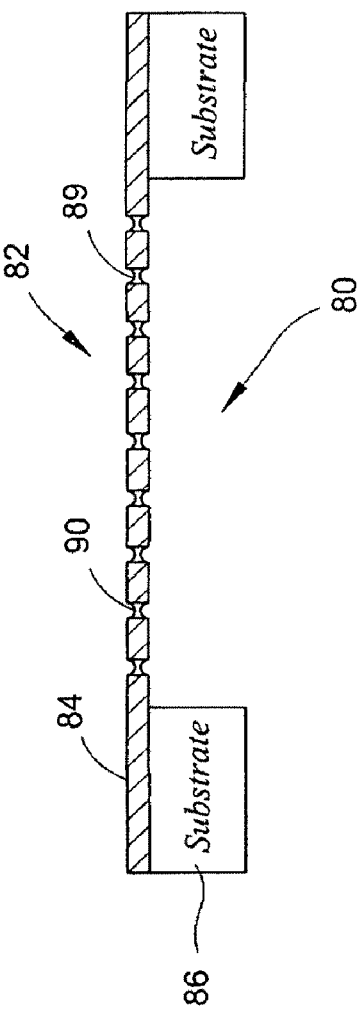

FIGS. 7a-7d illustrate one method of fabricating a microlens array 80 using the method of the present invention. A substrate 86 with a material layer 84 is provided, as in FIG. 7a. An array of holes 82 is made in material layer 84 on substrate 86, as shown in FIG. 7b. The holes 82 are then filled with a lens material 88, as shown in FIG. 7c. Subsequently, a portion of the substrate 86 is released from underneath the array of holes 82 filled with the lens material 88, as shown in FIG. 7d. The substrate 86 is then heated to a selected temperature that causes the lens material 88 to become molten and change its shape based on the surface tension and contact angle between it and the material layer 84 it is in contact with, as shown in FIG. 7d in order to form the shape of the plurality of lens elements 89 forming the lens array 80 shown in FIG. 7d. In this example, the material layer 84 and the lens material 88 are selected so that the lenses 89 are all concave.

FIGS. 8a-8d illustrate one method of fabricating another microlens array 90 using the method of the present invention. Here again, a substrate 96 with a material layer 94 is provided, as in FIG. 8a. An array of holes 92 is made in material layer 94 on substrate 96, as shown in FIG. 8b. The holes 92 are then filled with a lens material 98, as shown in FIG. 8c. Subsequently, a portion of the substrate 96 is released from underneath the array of holes 92 filled with the lens material 98, as shown in FIG. 8*d*. The substrate 96 is then heated to a selected temperature that causes the lens material 98 to become molten and change its shape based on the surface tension and contact angle between it and the material layer 94 it is in contact with, as shown in FIG. 8*d* in order to form the shape of the plurality of lens elements 99 forming the lens array 90 shown in FIG. 8*d*. In this example, the material layer 94 and the lens material 98 are selected so that the lenses 99 are all convex.

Figure 9A:
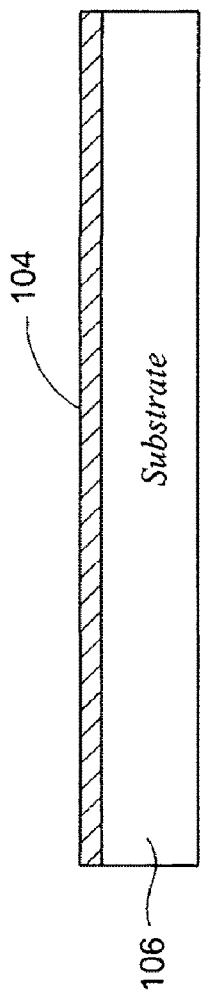
FIGS. 9a-9d are an illustration of a fabrication process according to the present invention for making a refractive plano-concave lens array type.
Figure 9B:
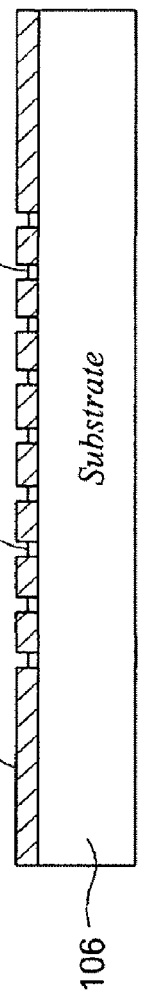
Figure 9C:
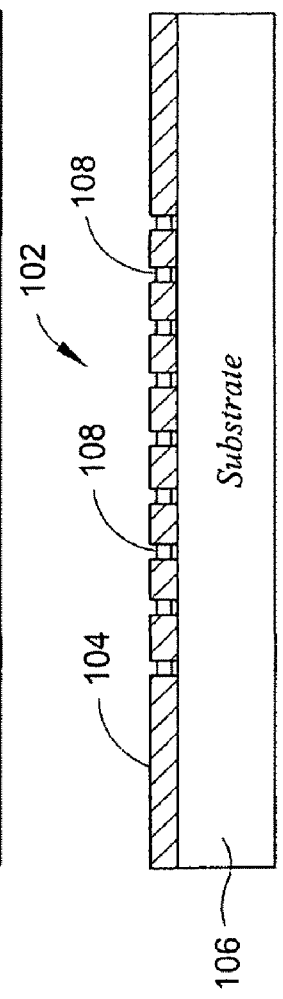
Figure 9D:
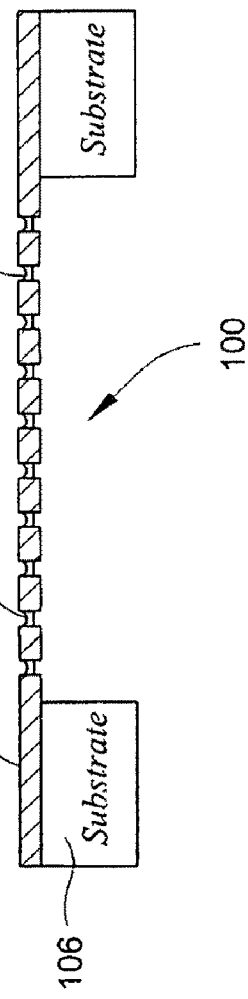

FIGS. 9*a*-9*d* illustrate one method of fabricating a planoconcave lens array 100 using the method of the present invention. A substrate 106 with a material layer 104 is provided, as in FIG. 9*a*. An array of holes 102 is made in material layer 104 on substrate 106, as shown in FIG. 9*b*. After the holes 102 are made in the material layer 104, a spacer layer 103 is deposited in the holes 102, followed by the deposition of the lens material layer 104. Subsequently, a portion of the substrate 106 is released from underneath the array of holes 102 filled with the lens material 108, as shown in FIG. 9*d*. The substrate 106 is then heated above the melting temperature of the lens material 108, whereupon the lens material 108 through surface tension and contact angle between it and the material layer 104 it is in contact with forms the desired smooth contour of a plano-concave lens 109. The substrate 106 and spacer layers 103 are removed, thereby leaving a plano-concave lens type 109, as shown. Obviously, a plano-convex lens, a planoconcave lens array, or a plano-convex lens array can be made using similar methods.

Importantly, the present invention provides a method for making lenses and lens arrays having low cost, as well as excellent performance. Furthermore, the present invention is not as constrained on dimensional size as the existing methods of fabricating lenses and lens arrays. Specifically, the fabrication of microlenses and microlens arrays is presently restricted to lenses wherein the diameter is on the order of several tens of microns or larger, with hundreds of microns being more common. One reason for this is that the existing techniques for fabricating lenses result in surface roughness, as well as shape distortions that become greater as the size of the lens is decreased. Therefore, lenses made with the existing techniques having dimensions below a few hundred microns have sub-standard performance. The present method can be used to make lower cost and higher performance lenses and lens arrays having dimensions comparable to other techniques (i.e., a few centimeters to tens of microns), but also can be used to fabricate lenses and lens arrays having dimensions that have unprecedented small dimensions (e.g., tens of microns and below).

The ability to make extremely small refractive lenses fulfills the needed application for manipulating short wavelength radiation, particularly in the Near Ultraviolet, (NUV), the Extreme Ultraviolet (EUV), and the X-Ray wavelengths, which have wavelengths that range from a few microns to a few nanometers. In these applications, refractive lenses are very difficult and costly to make, and the lens diameters may be very small (e.g., a lens diameter not much larger than the wavelength). However, conventional techniques to fabricate lens elements at these wavelengths result in rough surfaces and non-optimal shapes, which severely degrade the performance of these lenses.

An example of such a refractive lens is shown in FIGS. 10*a*-10*d*, which illustrate the fabrication of a refractive lens, wherein the lens material is ruthenium (Ru) and is designed to be used in an Extreme Ultraviolet (EUV) application, such as a EUV photolithographic system for next generation semiconductor integrated circuit fabrication. The method illustrated in FIGS. 10*a*-10*d* is similar to that described for FIGS. 7*a*-7*d*, in that a substrate 116 is provided with a material layer 114 and array of holes 112 in material layer 114. After the holes 112 are made in the material layer, a portion of the substrate 116 is released from underneath the holes, whereupon the substrate 116 is heated above the melting temperature of the lens material 118 so that the lens material through surface tension and the contact angle between it and the material layer forms the desired convex lenses. It should be noted that other shaped lenses can be made using the method of the present invention.

It is understood that the present disclosure conveys the most significant attribute of the present invention, that is, the use of surface tension effects of a material in a molten state on a solid surface that has been specifically machined to form a smooth and desired lens shape. Moreover, the present disclosure describes a few of the specific methods to implement different lens structures and types. However, it is also understood that the present invention is not limited only to the specific methods described herein and is equally applicable to any method using surface tension to form a lens or lens array.

While the invention has been described in connection with what is presently considered to be the most practical and preferred embodiments, it is to be understood that the invention is not to be limited to the disclosed embodiments, but on the contrary, is intended to cover various modifications and equivalent arrangements of the disclosed embodiments.

What is claimed is:

1. A method of fabricating at least one lens with improved surface smoothness, the method comprising the steps of:
   providing a substrate with a material layer on the substrate,
   making a hole in the material layer,
   providing a material from which the lens is to be made,
   depositing the lens material into the hole in the material layer,
   removing a portion of the substrate under the hole in which the lens material has been deposited, such that only the material layer surrounding the lens material is in contact with a perimeter of the lens material,
   heating the substrate to a temperature at which the lens material becomes molten and changes its shape to one of a plurality of lens shapes with its optical surfaces not being contacted by the substrate, and
   cooling the material layer and the lens material to room temperature to solidify the lens material and retain the lens shape,
   the shape of the lens and its optical surfaces being determined by a surface tension and contact angle between the heated lens material and the surrounding material layer in contact with the lens material.

2. The method of claim 1, wherein the contact angle of an interface between the heated lens material and material layer being predictable using a predefined thermodynamic equation.

3. The method of claim 2, wherein the predefined thermodynamic equation is $0=\gamma_{SV}-\gamma_{SL}-\gamma_{LG}\cos\Theta_c$, where $\gamma_{SV}$ is a solid-vapor interfacial energy, $\gamma_{SL}$ is a solid-liquid interfacial energy, $\gamma_{LG}$ is a liquid-gas interfacial energy, and $\Theta_c$ is the equilibrium contact angle, and where the solid is the material layer, the liquid is the lens material and the vapor is a gaseous medium, such as air, surrounding the lens material and material layer.

4. The method of claim 1, wherein the shape of the lens is further predictable according to an amount of wetting between the lens material/material layer interface.

5. The method of claim 4, wherein the lens material and/or the material layer are selected to produce a contact angle varying from 0 to 180 degrees, depending on the type of lens to be fabricated and the resultant shape of the lens to be fabricated.

6. The method of claim 4, wherein the lens material and/or the material layer are selected to produce a contact angle of approximately 0 degrees, the wetting being such that the lens material spreads to cover a large area of the material layer at the lens material/material layer interface.

7. The method of claim 4, wherein the lens material and/or the material layer are selected to produce a contact angle of approximately 150-180 degrees, that the wetting being such that the lens material forms a compact droplet on a surface of the material layer at the lens material/material layer interface.

8. The method of claim 4, wherein the material layer is selected to be a hydrophilic or wettable surface.

9. The method of claim 4, wherein the material layer is selected to be a hydrophobic or non-wettable surface.

10. The method of claim 4, wherein the contact angle and the amount of wetting between the lens material and the material layer is selected so that the lens is a biconvex lens.

11. The method of claim 4, wherein the contact angle and the amount of wetting between the lens material and the material layer is selected so that the lens is a biconcave lens.

12. The method of claim 4, wherein the contact angle and the amount of wetting between the lens material and the material layer is selected so that the lens is a positive meniscus lens.

13. The method of claim 4, wherein the contact angle and the amount of wetting between the lens material and the material layer is selected so that the lens is a negative meniscus lens.

14. The method of claim 4, wherein the method further comprises depositing a spacer material in the hole before the lens material is deposited in the hole, and wherein the contact angle and the amount of wetting between the lens material and the material layer is selected so that the lens is a plano-convex lens.

15. The method of claim 4, wherein the method further comprises depositing a spacer material in the hole before the lens material is deposited in the hole, and wherein the contact angle and the amount of wetting between the lens material and the material layer is selected so that the lens is a plano-concave lens.

16. The method of claim 1, wherein the method for making the hole varies, depending on the size of the hole, as well as the materials from which the substrate and material layer are made.

17. The method of claim 1, wherein the material layer is a thin layer, and wherein the method of making the hole comprises the steps of performing photolithography on the thin material layer so as to result in a pattern transfer from a photo mask to a resist layer mask on a surface of the material layer, and subsequently etching the material layer to form the hole.

18. The method of claim 17, wherein the etching is performed using Reactive Ion Etching (RIE).

19. The method of claim 1, wherein the material layer is an elemental material, a compound material or an alloy.

20. The method of claim 1, wherein the lens diameter has a size ranging from several centimeters to several tens of nanometers, depending on the size of the holes made in the material layer.

21. The method of claim 1, wherein a spacing layer is deposited into the plurality of holes in the material layer before the lens material is deposited into the plurality of holes in the material layer, and wherein the spacing layer is removed from the plurality of holes in the material layer after the heated lens material has been cooled so that the shape of the lenses is plano-convex.

22. The method of claim 1, wherein a spacing layer is deposited into the plurality of holes in the material layer before the lens material is deposited into the plurality of holes in the material layer, and wherein the spacing layer is removed from the plurality of holes in the material layer after the heated lens material has been cooled so that the shape of the lenses is plano-convex.

23. A method of fabricating at least one lens with improved surface smoothness, the method comprising the step of:
providing a substrate with a material layer on the substrate,
making a hole in the material layer,
providing a material from which the lens is to be made,
depositing the lens material into the hole in the material layer,
removing a portion of the substrate under the hole in which the lens material has been deposited,
heating the substrate to a temperature at which the lens material becomes molten and changes its shape to a lens shape based on a surface tension and contact angle between the lens material and the material layer with which it is in contact, and
cooling the material layer and the lens material to room temperature to solidify the lens material and retain the lens shape,
the shape of the lens being determined by a surface tension and contact angle between the heated lens material and material layer in contact with the lens material, and
the lens material being ruthenium so that the lens is to be used in an extreme ultraviolet application.

24. A method of fabricating an array of lenses with improved surface smoothness, the method comprising the steps of:
providing a substrate with a material layer,
making a plurality of holes in the material layer,
providing a material from which the lenses comprising the array are to be made,
depositing the lens material into the plurality of holes in the material layer,
removing a portion of the substrate under the plurality of holes in which the lens material has been deposited, such that only the material layer surrounding the lens material is in contact with a perimeter of the lens material,
heating the substrate to a temperature at which the lens material becomes molten and changes its shape to one of a plurality of lens shapes with its optical surfaces not contacted by the substrate, and
cooling the material layer and the lens material to room temperature to solidify the lens material and retain the lens shape,
the shape of the lenses and it optical surfaces being determined by a surface tension and contact angle between the heated lens material and the surrounding material layer in contact with the lens material.

25. The method of claim 24, wherein the contact angle of an interface between the heated lens material and material layer being predictable using a predefined thermodynamic equation.

26. The method of claim 25, wherein the predefined thermodynamic equation is $0 = \gamma_{SV} - \gamma_{SL} - \gamma_{LG} \cos \Theta_c$, where $\gamma_{SV}$ is a solid-vapor interfacial energy, $\gamma_{SL}$ is a solid-liquid interfacial energy, $\gamma_{LG}$ is a liquid-gas interfacial energy, and $\Theta_c$ is the equilibrium contact angle, and where the solid is the material layer, the liquid is the lens material and the vapor is a gaseous medium, such as air, surrounding the lens material and material layer.

27. The method of claim 24, wherein the shape of the lens is further predictable according to an amount of wetting between the lens material and material layer interface.

28. The method of claim 24, wherein the lens material and/or the material layer are selected to produce a contact angle varying from 0 to 180 degrees, depending on the type of lens to be fabricated and the resultant shape of the lens to be fabricated.

29. The method of claim 24, wherein the lens material and/or the material layer are selected to produce a contact angle of approximately 0 degrees, the wetting being such that the lens material spreads to cover a large area of the material layer at the lens material/material layer interface.

30. The method of claim 24, wherein the lens material and/or the material layer are selected to produce a large contact angle of approximately 150-180 degrees, the wetting being such that the lens material forms a compact droplet on a surface of the material layer at the lens material/material layer interface.

31. The method of claim 24, wherein the material layer is selected to be a hydrophilic or wettable surface.

32. The method of claim 24, wherein the material layer is selected to be a hydrophobic or non-wettable surface.

33. The method of claim 24, wherein the contact angle and the amount of wetting between the lens material and the material layer is selected so that the lenses are biconvex lenses.

34. The method of claim 24, wherein the contact angle and the amount of wetting between the lens material and the material layer is selected so that the lenses biconcave lenses.

35. The method of claim 24, wherein the contact angle and the amount of wetting between the lens material and the material layer is selected so that the lenses are positive meniscus lenses.

36. The method of claim 24, wherein the contact angle and the amount of wetting between the lens material and the material layer is selected so that the lenses are negative meniscus lenses.

37. The method of claim 24, wherein the method further comprises depositing a spacer material in the plurality of holes before the lens material is deposited in the plurality of holes, and wherein the contact angle and the amount of wetting between the lens material and the material layer is selected so that the lenses are plano-convex lenses.

38. The method of claim 24, wherein the method further comprises depositing a spacer material in the plurality of holes before the lens material is deposited in the plurality of holes, and wherein the contact angle and the amount of wetting between the lens material and the material layer is selected so that the lenses are plano-concave lenses.

39. The method of claim 24, wherein the method for making the holes varies, depending on the size of the holes, as well as the materials from which the substrate and material layer are made.

40. The method of claim 24, wherein the material layer is a thin layer, and wherein the method of making the holes comprises the steps of performing photolithography on the thin material layer so as to result in a pattern transfer from a photo mask to a resist layer mask on a surface of the material layer, and subsequently etching the material layer to form the holes.

41. The method of claim 40, wherein the etching is performed using Reactive Ion Etching (RIE).

42. The method of claim 24, wherein the material layer is an elemental material, a compound material or an alloy.

43. The method of claim 24, wherein the lens diameter has a size ranging from several centimeters down to several tens of nanometers, depending on the size of the holes made in the material layer.

44. The method of claim 24, wherein a spacing layer is deposited into the plurality of holes in the material layer before the lens material is deposited into the plurality of holes in the material layer, and wherein the spacing layer is removed from the plurality of holes in the material layer after the heated lens material has been cooled so that the shape of the lenses is plano-concave.

45. The method of claim 24, wherein a spacing layer is deposited into the plurality of holes in the material layer before the lens material is deposited into the plurality of holes in the material layer, and wherein the spacing layer is removed from the plurality of holes in the material layer after the heated lens material has been cooled so that the shape of the lenses is plano-convex.

46. A method of fabricating an array of lenses with improved surface smoothness, the method comprising the steps of:
   providing a substrate with a material layer,
   making a plurality of holes in the material layer,
   providing a material from which the lenses comprising the array are to be made,
   depositing the lens material into the plurality of holes in the material layer,
   removing a portion of the substrate under the plurality of holes in which the lens material has been deposited,
   heating the material to a temperature at which the lens material becomes molten and changes its shape to a lens shape based on a surface tension and contact angle between the lens material and the substrate with which it is in contact, and
   cooling the material layer and the lens material to room temperature to solidify the lens material and retain the lens shape,
   the shape of the lenses being determined by a surface tension and contact angle between the heated lens material and material layer in contact with the lens material, and
   the lens material being ruthenium so that the lens is to be used in an extreme ultraviolet application.

47. A method of fabricating a lens with first and second lens surfaces and improved surface smoothness, the method comprising the steps of:
   providing a substrate,
   making a hole through the substrate,
   providing a material from which the lens is to be made,
   depositing the lens material into the hole in the substrate, whereby only a perimeter of the lens material is in contact with the substrate,
   heating the substrate to a temperature at which the lens material becomes molten and changes its shape to one of a plurality of lens shapes with first and second optical surfaces not contacted by the substrate, and
   cooling the substrate and the lens material to room temperature to solidify the lens material and retain the lens shape,
   the shape of the lens and its optical surfaces being determined by a surface tension and contact angle between the heated lens material and the surrounding substrate in contact with the heated lens material.

* * * * *